(12) United States Patent
Cirkovic et al.

(10) Patent No.: US 7,990,852 B1
(45) Date of Patent: Aug. 2, 2011

(54) METHODS AND APPARATUS FOR IMPROVING NETWORK COMMUNICATION USING BFD AND VRRP TRACKING SYSTEM

(75) Inventors: Sasha Cirkovic, Mountain View, CA (US); Chirayu A. Shah, Fremont, CA (US); Balaji Rajagopalan, Sunnyvale, CA (US); Anuradha Karuppiah, San Jose, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 276 days.

(21) Appl. No.: 12/421,847

(22) Filed: Apr. 10, 2009

Related U.S. Application Data

(60) Provisional application No. 61/188,973, filed on Aug. 14, 2008.

(51) Int. Cl.
*G01R 31/08* (2006.01)
*G06F 11/00* (2006.01)

(52) U.S. Cl. .............. 370/228; 370/242; 714/2; 714/25; 714/47

(58) Field of Classification Search .................... None
See application file for complete search history.

(56) References Cited

U.S. PATENT DOCUMENTS

| | | | | |
|---|---|---|---|---|
| 7,231,462 | B2* | 6/2007 | Berthaud et al. | 709/249 |
| 7,318,179 | B1* | 1/2008 | Fernandes | 714/55 |
| 7,433,317 | B2* | 10/2008 | Kobayashi et al. | 370/241 |
| 7,447,800 | B2* | 11/2008 | Kobayashi et al. | 709/242 |
| 7,499,395 | B2* | 3/2009 | Rahman et al. | 370/229 |
| 7,603,480 | B2* | 10/2009 | Imai et al. | 709/239 |
| 7,636,364 | B2* | 12/2009 | Fotedar | 370/401 |
| 7,738,367 | B1* | 6/2010 | Aggarwal et al. | 370/229 |
| 7,839,789 | B2* | 11/2010 | Kakadia et al. | 370/235 |
| 2003/0233473 | A1* | 12/2003 | Bonhomme et al. | 709/238 |
| 2004/0008694 | A1* | 1/2004 | Guo | 370/395.52 |
| 2008/0219207 | A1* | 9/2008 | Chen et al. | 370/328 |
| 2009/0268607 | A1* | 10/2009 | Wang et al. | 370/218 |

* cited by examiner

*Primary Examiner* — Nittaya Juntima
(74) *Attorney, Agent, or Firm* — James M. Wu; JW Law Group (57) ABSTRACT

An apparatus and method of a network system between a host and a group of routers using virtual router redundancy protocol ("VRRP") messages and bidirectional forwarding detection ("BFD") sessions are disclosed. The network system is capable of facilitating a first communication between a host and a master router of multiple VRRP routers and establishing a BFD session between the host and the master router. When the BFD session fails, the priority of the master router is subsequently lowered and a backup router is activated. In one embodiment, the backup router capable of performing functions of the master router becomes a new master until the BFD session resumes.

20 Claims, 8 Drawing Sheets

METHODS AND APPARATUS FOR IMPROVING NETWORK COMMUNICATION USING BFD AND VRRP TRACKING SYSTEM

CROSS-REFERENCE TO RELATED APPLICATIONS

This application claims the priority of an earlier filed U.S. provisional application Ser. No. 61/188,973, filed on Aug. 14, 2008.

FIELD

The exemplary embodiment(s) of the present invention relates to communications network. More specifically, the exemplary embodiment(s) of the present invention relates to improve network performance employing BFD and VRRP tracking system.

BACKGROUND

A high-speed network environment typically includes network devices such as routers and bridges used for facilitating delivery of information packets and/or data traffic from source devices to destination devices. Information pertaining to the transfer of packet(s) through the network is usually embedded within the packet itself. Each packet traveling through one or more communications networks such as Internet and/or Ethernet can typically be handled independently from other packets in a packet stream or traffic. For example, each router which may include routing, switching, and/or bridging engines processes incoming packets and determines where the packet(s) should be forwarded.

In a high-speed computing network environment, it is critical to maintain high speed traffic flows with minimal data loss and/or packet drop. As such, it is important to detect failures relating to data links and/or connections between the network devices, thereby the traffic flows can be maintained and rerouted for reducing packet drop(s). A problem associated with a high-speed computing network is data (or packet) loss due to data connection(s) (or data link) failure. A cause of data loss is to continue sending the data packets to a router over a data link after the data link is already down.

A conventional detecting method such as Virtual Circuit Connectivity Verification ("VCCV") channel over a pseudowire ("PW") has been employed to enhance the network reliability. For example, inband VCCV channel implemented using an MPLS PW control word (CW) may increase the ability of the network operator to understand the status of each individual PW on an end-to-end basis across the network. Virtual Router Redundancy Protocol ("VRRP") is another widely used method to detect link failure(s). VRRP, however, is typically not reliable to protect end-to-end service by VRRP routers when end user is not connected on the same LAN segment as the VRRP routers.

A problem associated with the conventional approach(s) is that the detection is not quick enough to stop or reroute data packets away from a down link.

SUMMARY

An apparatus and method of a network system providing a communication between a host and a group of routers using a Virtual Router Redundancy Protocol ("VRRP") tracking mechanism and Bidirectional Forwarding Detection ("BFD") sessions are disclosed. The network system is capable of facilitating a first communication between a host and a master router of the group of VRRP routers and establishing a BFD session between the host and the master router. When the BFD session fails, the priority of the master router is lowered and a backup router is activated. In one embodiment, the backup router capable of performing the functions of master router becomes a new master until the BFD session resumes.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of improving network performance using Virtual Router Redundancy Protocol ("VRRP") and Bidirectional Forwarding Detection ("BFD") tracking system.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items Embodiments of the present invention illustrate a network system configured to enhance network performance using a VRRP tracking mechanism and BFD session(s). The network system is capable of facilitating a data communication between a host and a master router which, for example, is one of the VRRP routers with the highest priority. In addition, a BFD session between the host and the master router is formed to verify connectivity between the host and the master router. Upon detecting the failure of the BFD session, the priority of the master router is lowered via the VRRP tracking mechanism. A backup router is subsequently activated in response to the VRRP tracking mechanism. In one embodiment, the backup router subsequently becomes the new master router until the BFD session is reestablished.

Figure 1:
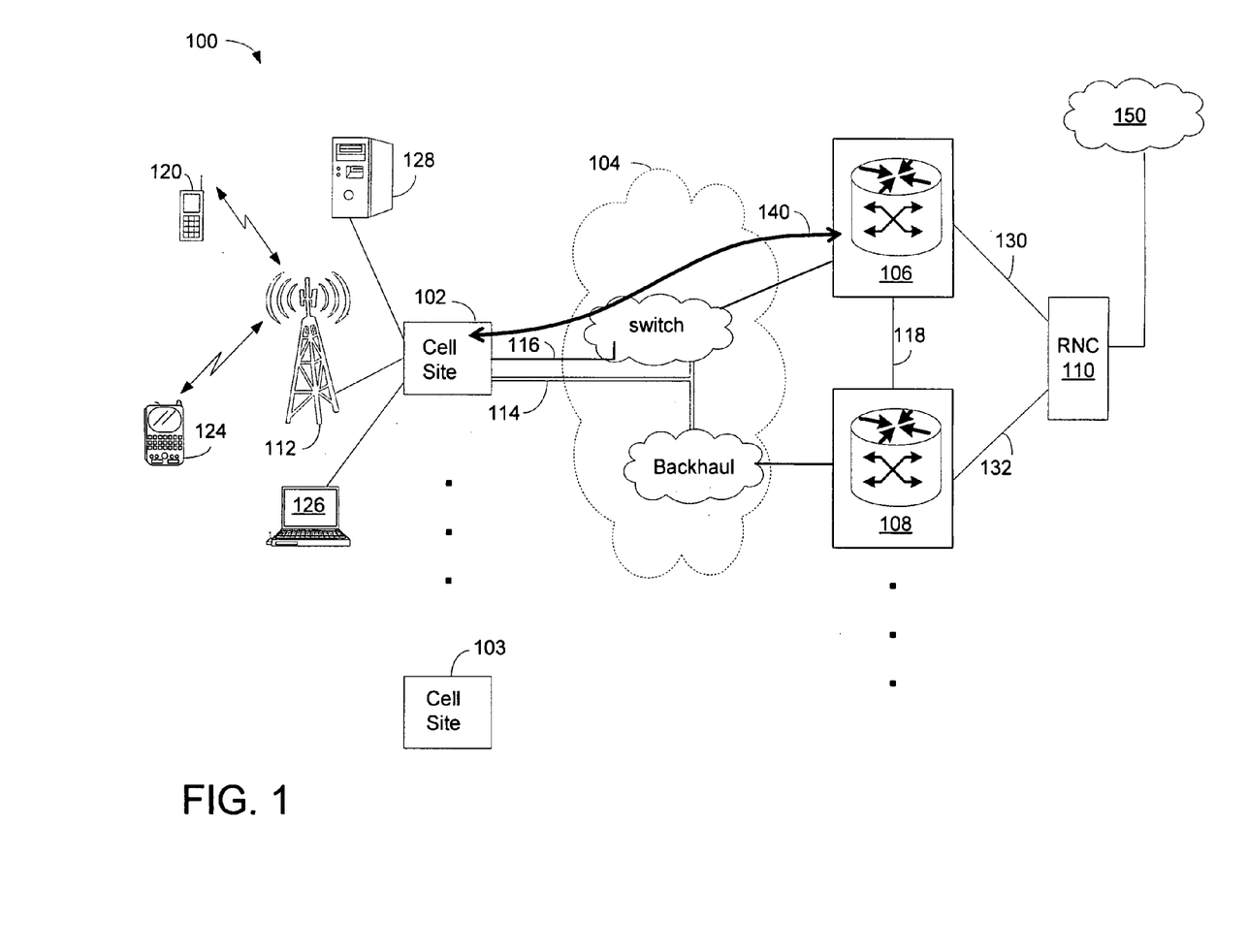
FIG. 1 is a block diagram illustrating a computer network having a master router and backup routers in accordance with one embodiment of the present invention.

FIG. 1 is a block diagram 100 illustrating a computer network having a master router and a backup router in accordance with one embodiment of the present invention. Diagram 100 includes multiple cell sites 102-103, a switching network 104, multiple routers 106-108, and a Radio Network Controller ("RNC") 110. RNC 110 is further coupled with a Wide Area Network ("WAN") and/or Internet 150. Depending on the applications, RNC 110 may be coupled with other RNC or RNCs to enhance network management and capacities. Connections 130-132 are used to couple RNC 110 with routers 106-108 wherein connections 130-132 can be wired lines connections, wireless connections, or a combination of wired lines and wireless connections. It should be noted that the underlying concept of the exemplary embodiment(s) of the present invention would not change if one or more blocks (or circuits) were added to or removed from diagram 100.

Each router such as router 106 or 108, in one embodiment, is prioritized in a sequential order wherein a router with the lower priority backs up a router with higher priority. A router with the highest priority is the master router. Router priority, in one embodiment, is managed by a VRRP messaging system. The VRRP is an object tracking system capable of systematically electing and/or assigning routing tasks to one or more VRRP routers. A router using VRRP is also known as VRRP router. The terms "router" and "VRRP router" are used interchangeably hereinafter. In a VRRP environment, a router is selected as a master router while other routers are designated as a series of backup routers with a predefined order for backup the master router.

The routers such as routers 106-108 are interconnected by Interior Gateway Protocol ("IGP") 118. Each router, for example, includes functions of IP routing. In one embodiment, a router such as router 106 is capable of establishing a BFD session 140 directly to a host such as cell site 102 for monitoring connectivity between router 106 and cell site 102 via switching network 104.

Switching network 104, as indicated in FIG. 1, is capable of transporting information between circuit-based clients and packet-switching clients. Switching network 104 can be an IP and/or Multi Protocol Label Switching ("MPLS") based switching network which may operate at a layer of Open Systems Interconnection Basic Reference Model ("OSI model"). In one embodiment, network 104 includes a switch block and a backhaul block used for transferring information and/or various data traffic to and from network clients. Network client in one example may include one or more routers, switches, hosts, base stations, and the like. Network 104 is capable of routing information between cell sites 102-103 and RNC 110 via routers 106-108. For example, while the switch block of network 104 transmits information between cell site 102 and router 106 via bus 116, the backhaul block of network 104 transmits information between cells site 102 and router 108 via bus 114.

Cell site 102, also known as a base station, includes a radio tower 112, a computer 126, and a server 128, wherein radio tower 112 further includes a cellular phone 120 and a handheld device 124 connected via wireless communications. Base station or cell site 102 is capable of communicating with mobile devices such as cellular phone 120 and handheld device 124 via radio tower 112. It should be noted that cell site 102, not shown in FIG. 1, may include additional radio towers as well as other land switching circuitry. The cell stations such as cell sites 102-103 can be configured to support wireless communications as well as wired communications. Each cell site such as cell site 102 can be considered as a host and it is capable of maintaining a connectivity session such as a BFD session with a destination router for continuously verifying the connectivity between the host and the router.

BFD is a network connectivity protocol used to authenticate or detect failures between two endpoints (i.e., a host and a master router). BFD is a short-duration for failure detection for path(s) between forwarding network elements including interfaces, data links, forwarding planes, and forwarding engines. For example, a BFD session between a host and a master router can be established over a network channel or link for verifying connectivity between the host and the master router. Multiple BFD sessions can also be formed if more than one network links existed between two endpoints. A session is failed or down if a BFD packet(s) is failed to receive. It should be noted that, instead of using BFD sessions, other connectivity protocols can also be used. For example, Open Shortest Path First ("OSPF"), Intermediate System to Intermediate System ("IS-IS"), and/or any other protocols complying IEEE 802.1ag can be used in place of BFD.

During an operation, one of the endpoints initiates an Echo function. Upon activation, Echo packets are sent by one of the endpoints. Upon receipt of the Echo packets, the other endpoint subsequently sends the Echo packets back to the sender via a connectivity session such as a BFD session. The connectivity between the two endpoints is failed if one of the endpoints does not receive the Echo packets.

As FIG. 1 illustrated, a host or cell site 102 is configured to communicate with a VRRP master router 106, wherein VRRP master router 106 establishes a BFD session 140 with host 102. When BFD session 140 fails, master router 106 sends VRRP messages to broadcast lowering master router's priority. For example, VRRP priority message declares that master router 106 has reduced its priority to the lowest priority. The lowering priority of master router 106 triggers and/or activates a backup VRRP router such as router 108 which becomes the new master router and takes over the routing task from router 106. When BFD session is reestablished, the previous master router such as router 106 broadcasts a VRRP message to raise the priority of router 106 from the lowest priority to the highest priority. Upon resetting the priority to the highest, router 106 reassumes the master router status and takes over the routing tasks from its backup router 108.

An advantage of using BFD and VRRP tracking system is that when the master router detects a failure of the BFD session, the master router assumes that the data link such as bus 116 is down as well. The master router such as router 106 uses the VRRP messaging system to activate or wake up the backup router such as router 108 to take over the routing task. Router 108 takes over the routing task from router 106 when priority of router 108 is higher than the priority 106. As such, the data traffic between cell site 102 and RNC 110 is not affected although the router master has changed from router 106 to router 108.

Figure 2:
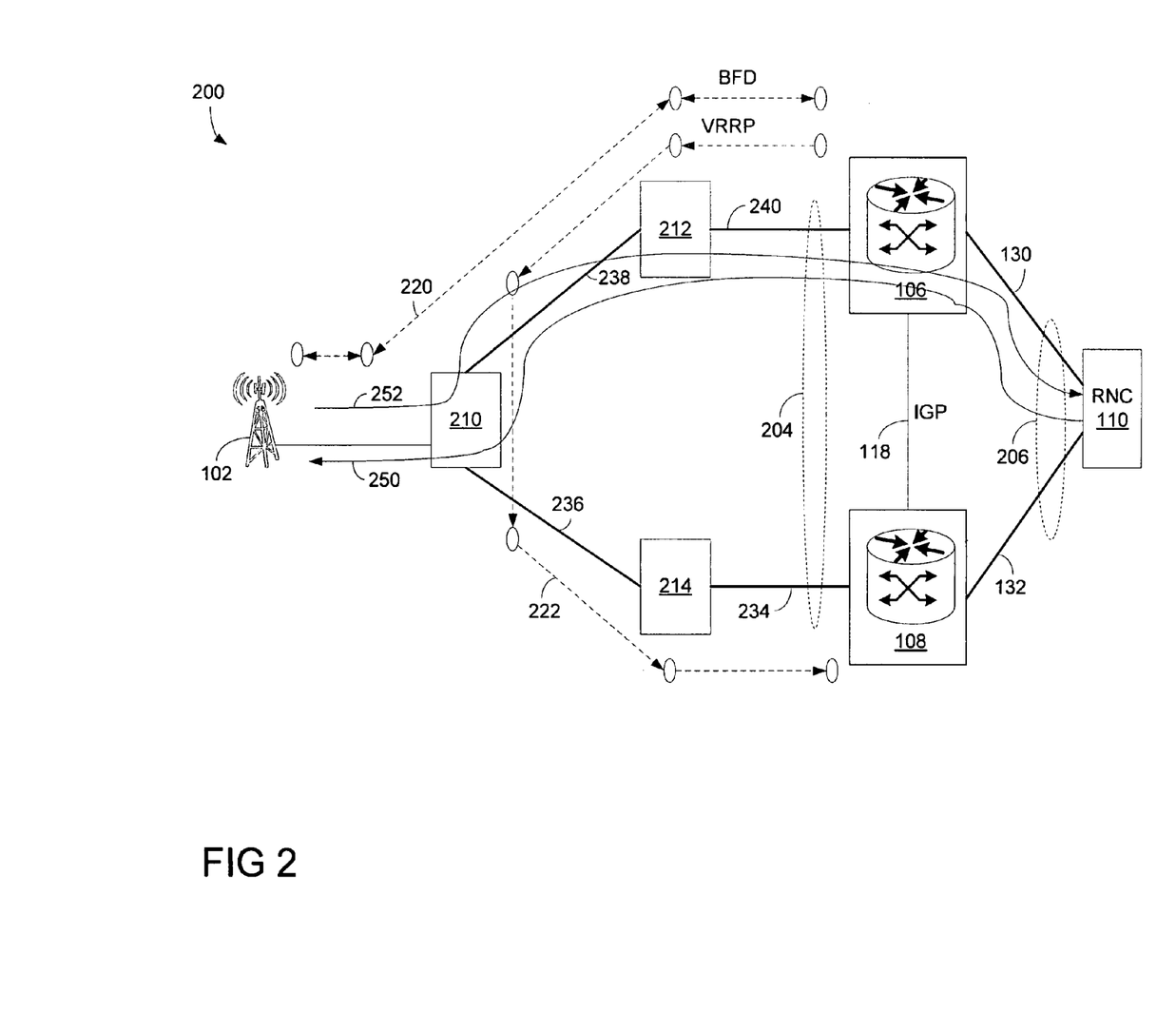
FIG. 2 is a block diagram illustrating an exemplary computer network having multiple VRRP routers managed by BFD and VRRP in accordance with one embodiment of the present invention.

FIG. 2 is a block diagram 200 illustrating an exemplary computer network having multiple VRRP routers managed by BFD and VRRP in accordance with one embodiment of the present invention. Diagram 200 illustrates a base station or cell site 102, VRRP routers 106-108, an RNC 110, and Access Gate switches ("AGS") 210-214. AGS 210-214 are capable of performing switch and/or router functions for routing network traffic including voice, data, and video information. It should be noted that the underlying concept of the exemplary embodiment(s) of the present invention would not change if one or more blocks (circuit) were added to or removed from diagram 200.

Cell site 102, as discussed earlier, includes a radio tower(s), computers, servers, and the like. In one embodiment, a BFD session 220 is established between router 106 and cell site 102 for connectivity verification. It should be noted that another BFD session, not shown in FIG. 2, may also be established between cell site 102 and router 108. It should be noted that BFD session 220 can travel through multiple devices such as AGS 210-212 before reaching cell site 102. BFD session 220 continuously verifies the connectivity between cell site 102 and router 106.

A VRRP tracking system 222, in one embodiment, is established between router 106 and router 108 via AGS 210-214. VRRP tracking system 222 herein can also be referred to as VRRP tracking mechanism, VRRP network, VRRP messaging system, VRRP communication channels. System 222 is capable of facilitating or issuing VRRP messages for assigning router priorities associated with traffic destinations. It should be noted that it does not alter the underlying concept of the exemplary embodiments if more or less AGS are used to facilitate the VRRP message(s). While area 204 can be view as the coupling area between the NB service interface and VRRP routers, area 206 illustrates a coupling area between RNC and VRRP routers. VRRP message controlled by VRRP tracking system 222 is capable of providing the priority to routers 106-108.

The computer network, in one embodiment, supports and facilitates various interfaces, such as IP Virtual Local Area Network ("VLAN") interface, IP QinQ interface, IP Ethernet interface, and the like. The system, for example, triggers a VRRP switch over from a master router to a backup router when the BFD session has been failed. The system should be able to associate a BFD session with a VRRP virtual router.

BFD packets, in one example, are sequentially sent to an inband Virtual Circuit Connectivity Verification ("VCCV") channel of a pseudowire ("PW"). VCCV BFD enhances the detection time of the connected/not connected status of each PW across the network. It should be noted that PW emulates native services such as ATM and Ethernet to a Packet Switched Network ("PSN") such as MPLS. The VCCV channel, in one embodiment, can be utilized to handle BFD, wherein the BFD transmitted by the VCCV can provide early warning(s) indicating problems in an individual PW across the network. It should be noted that the VCCV with the BFD feature adds connectivity monitoring capability for PWs using the BFD mechanism.

During an operation, when BFD session 220 verifies normal connectivity, router 106, a master router, maintains data link(s) or data session(s) between cell site 102 and router 106. For a master router, it should have a priority value of 255 which is the highest priority among the VRRP routers. When router 106 is the master router, router 106 is responsible to route network traffic between cell site 102 and RNC 110. Router 106, for example, routes data over data paths 250-252, wherein data path 250 transports data stream from cell site 102 to RNC 110 and data path 252 transports data stream from RNC 110 to cell site 102. It should be noted that other data paths may also be formed in connection to router 106 but they are not important to understand the embodiment(s) of the present invention.

Figure 3:
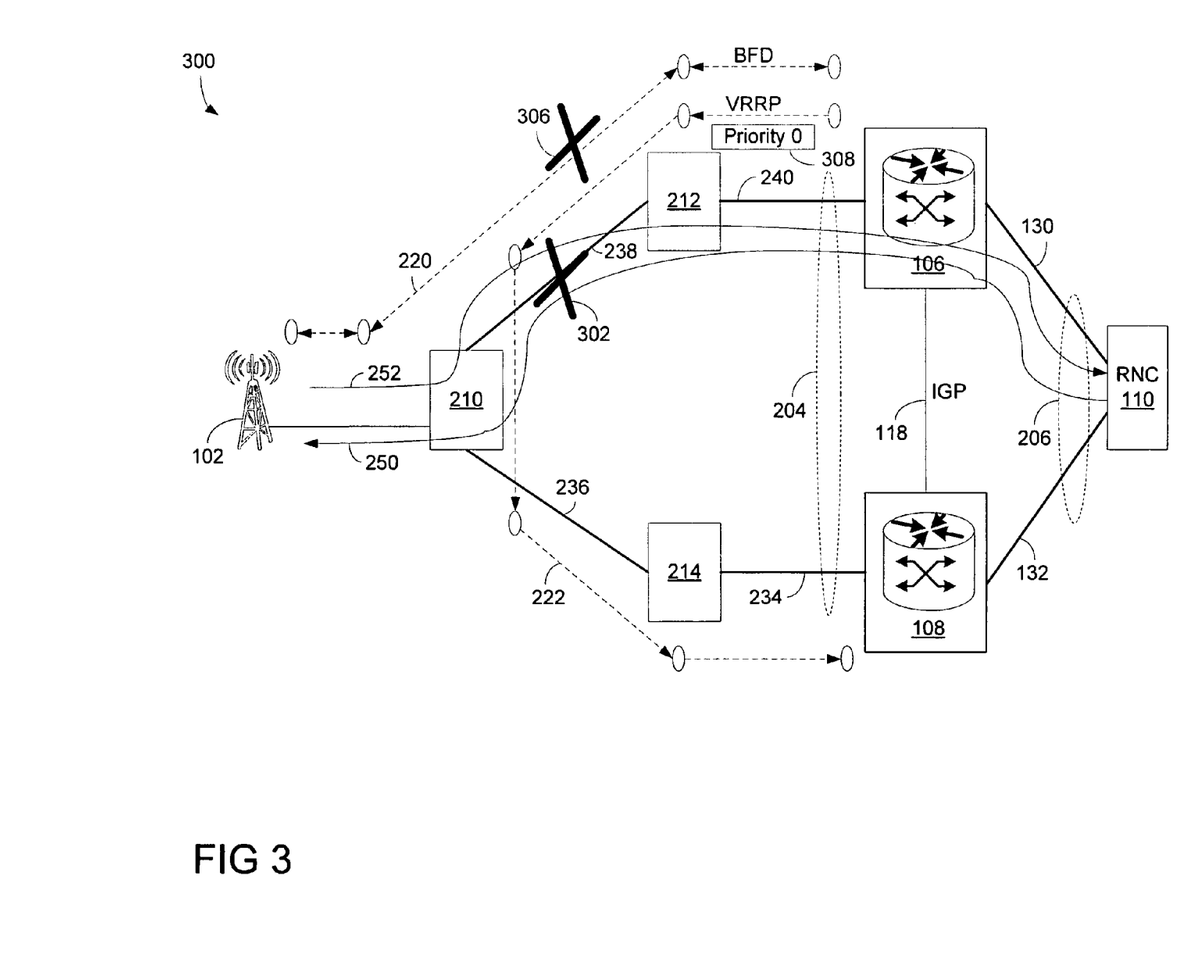
FIG. 3 is a block diagram illustrating an exemplary process of identifying session failure by BFD in accordance with one embodiment of the present invention.

FIG. 3 is a block diagram 300 illustrating an exemplary process of identifying session failure by BFD in accordance with one embodiment of the present invention. Diagram 300, which is similar to diagram 200 shown in FIG. 2, illustrates a host or base station 102, VRRP routers 106-108, an RNC 110, and Access Gate switches ("AGS") 210-214. AGS 210-214 are capable of performing switch and/or router functions for routing network traffic including voice, data, and video information. It should be noted that the underlying concept of the exemplary embodiment(s) of the present invention would not change if one or more blocks (circuit) were added to or removed from diagram 300.

Host 102 is coupled to VRRP routers 106-108. Master VRRP router 106 maintains BFD session 220 with host 102. When BFD session 220 fails as indicated by a cross 306, master router 106 assumes and/or acknowledges that data link 238 is also down as indicated by a cross 302. Master router 106 subsequently lowers its priority by sending a VRRP priority message 308 with the lowest priority such as priority "0" over VRRP tracking mechanism 222. The VRRP priority message activates or wakes up a backup router such as router 108 to take over the routing tasks from original master router 106.

The priority for each VRRP router, for example, can be predefined with a priority sequence of "255" to "0" wherein priority "255" is the highest priority and priority "0" is the lowest priority. If router 106 has a priority value of "255" and is the master router, router 108, for example, may have a priority value of "200" and is assigned as a first inline backup router 108 for the master router. Router 108, in one embodiment, becomes the new master router when router 106 lowers its priority value from "255" to "0" via VRRP tracking mechanism 222. Router 106, however, can resume its status of master router by increasing its priority value from "0" to "255" via VRRP tracking mechanism 222.

Figure 4:
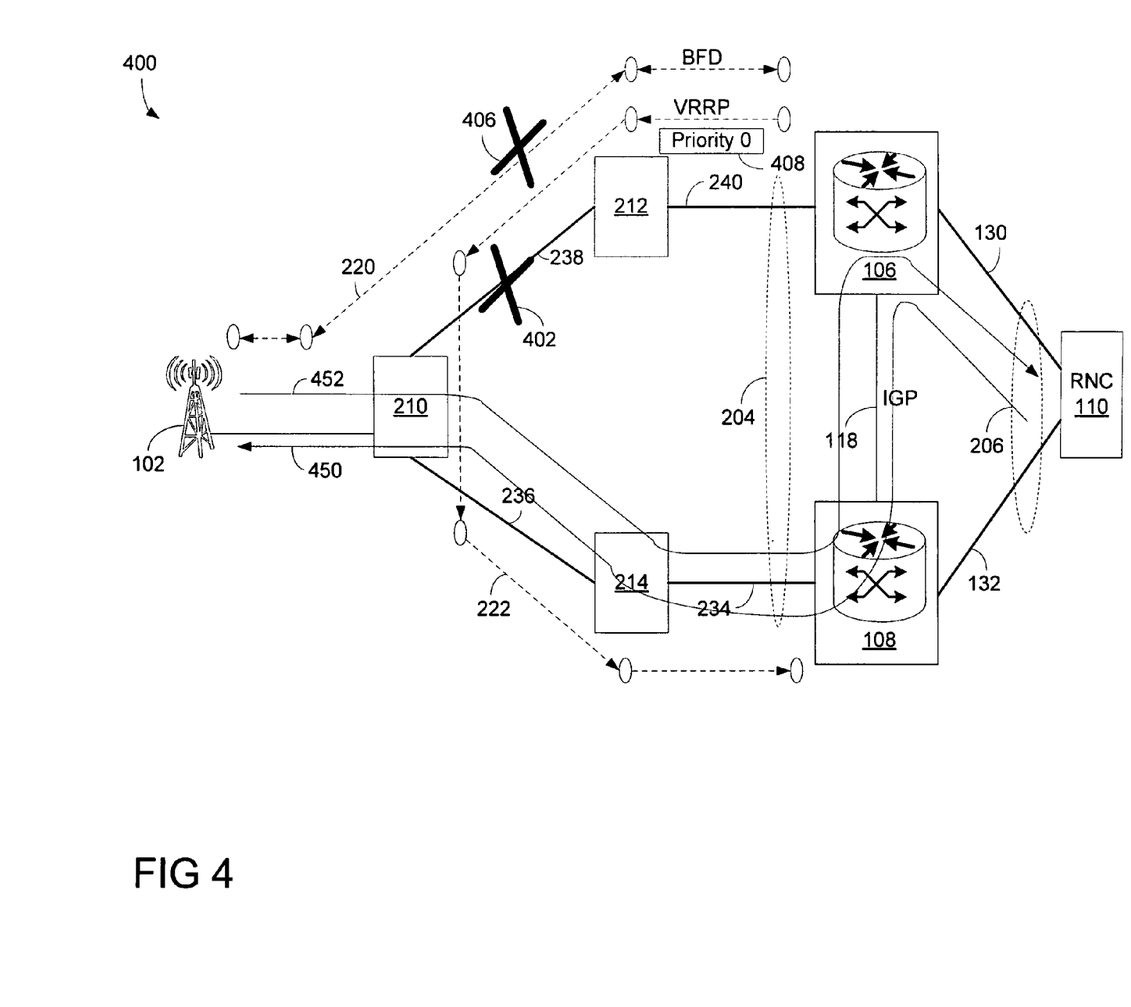
FIG. 4 is a diagram illustrating an exemplary process of switching routing path upon detecting session failure in accordance with one embodiment of the present invention.

FIG. 4 is a diagram 400 illustrating an exemplary process of switching routing path upon detecting session failure in accordance with one embodiment of the present invention. Diagram 400, which is similar to diagram 300 shown in FIG. 3, illustrates a host or base station 102, VRRP routers 106-108, an RNC 110, and Access Gate switches ("AGS") 210-214. It should be noted that the process illustrated in FIG. 4 is a continuation process shown in FIG. 3. As illustrated in FIG. 3, original master router 106 has lowered its priority value upon detecting BFD session failure. It should be noted that the underlying concept of the exemplary embodiment(s) of the present invention would not change if one or more blocks (circuit) were added to or removed from diagram 400.

Upon detecting the VRRP message indicating lowering priority value or level for the original master router 106, backup router 108 becomes the new master router and takes over the routing task between host 102 and RNC 110 from the original master router 106. New data paths 450-452 are established in place of original data paths 250-252 between host 102 and RNC 110. Data path 450, for example, facilitates data transfer from RNC 110 to host 102 via routers 106-108, AGS 210, and AGS 214. Data path 452, on the other hand, transfers data from host 102 to RNC 110 via routers 106-108, AGS 210, and AGS 214. Alternatively, data paths 450-452 can also travel through connection 132 instead of connections 118 and 130 to reach RNC 110. It should be noted that new master router 108 may also establish a BFD session between router 108 and host 102 for connectivity verification between host 102 and router 108.

Figure 5:
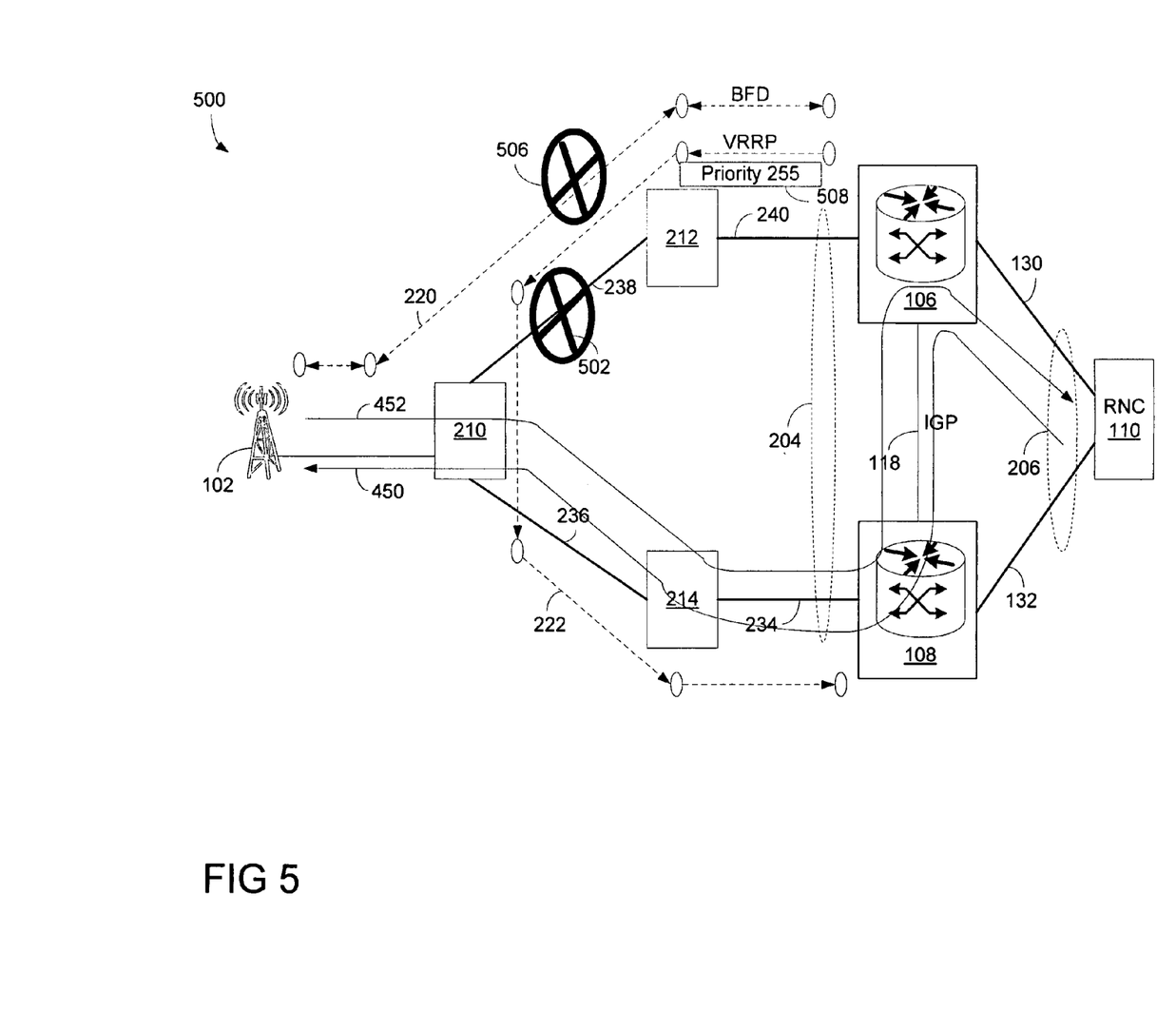
FIG. 5 is a diagram illustrating an exemplary process of session recovery in accordance with one embodiment of the present invention.

FIG. 5 is a diagram 500 illustrating an exemplary process of session recovery in accordance with one embodiment of the present invention. Diagram 500, which is similar to diagram 400 shown in FIG. 4, illustrates a host or base station 102, VRRP routers 106-108, an RNC 110, and Access Gate switches ("AGS") 210-214. It should be noted that the process illustrated in FIG. 5 is a continuation process illustrated in FIG. 4. As shown in FIG. 4, original master router 106 has lowered its priority and router 108 has taken over the routing tasks between host 102 and RNC 110. It should be noted that the underlying concept of the exemplary embodiment(s) of the present invention would not change if one or more blocks (circuit) were added to or removed from diagram 500.

After acknowledging down links 220 and 238, router 106 tries to recover and/or repair down links 220 and 238. When BFD session 220 and data link 238 are recovered and re-established as indicated by numerals 502-506, original master router 106 reasserts its status as master router by sending a VRRP message assigning the highest priority to router 106 via VRRP tracking mechanism 222. For example, upon recovering data link 238, router 106 issues a VRRP message raising the priority value from "0" to "255" for router 106 via VRRP tracking system 222. When router 108 receives and acknowledges the new highest priority value carried by the VRRP message, router 108 releases its status as a master router. Router 106 subsequently resumes its status as the master router and takes over the routing tasks between host 102 and RNC 110 from router 108.

Figure 6:
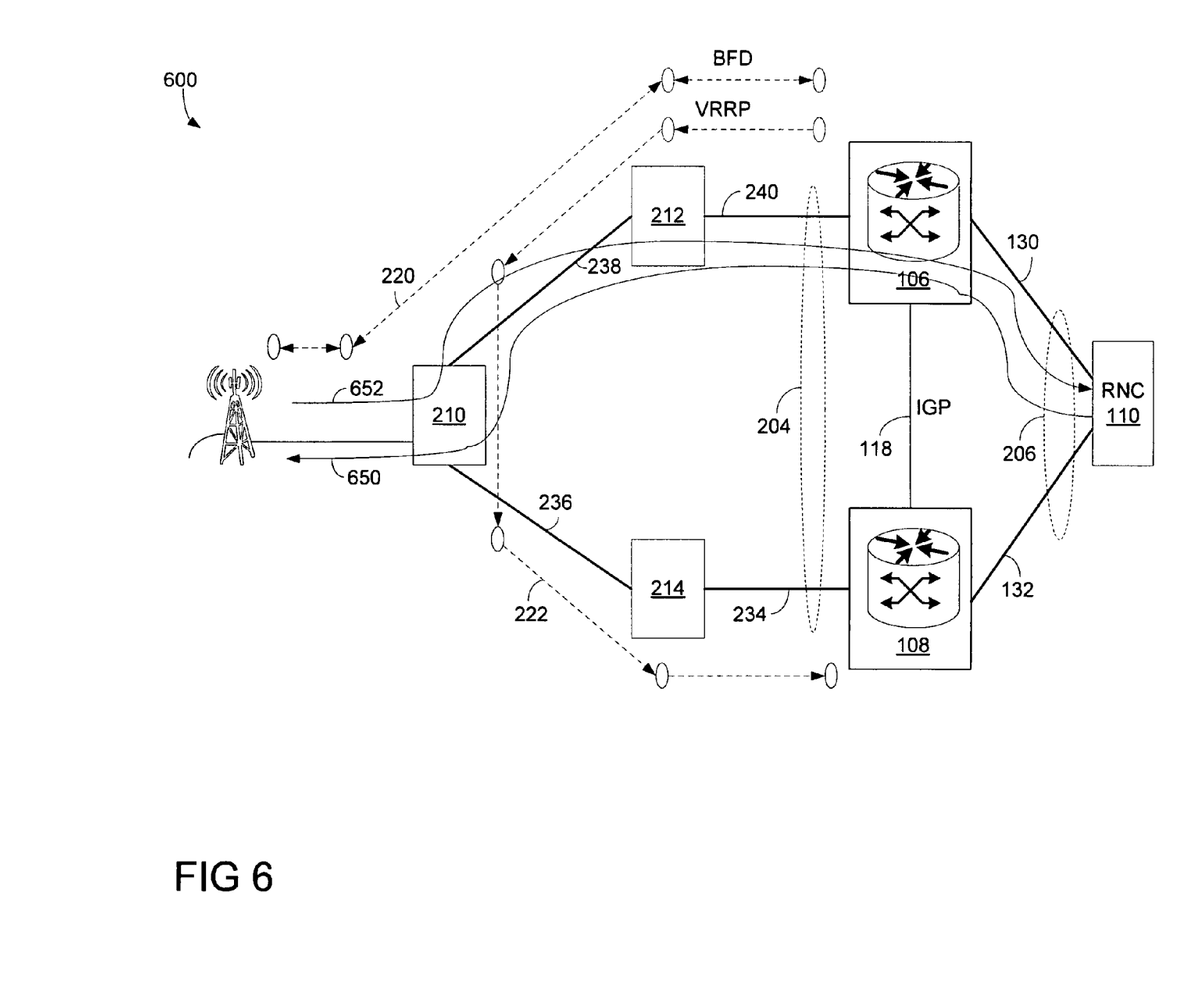
FIG. 6 is a diagram illustrating an exemplary process of data link recovery in accordance with one embodiment of the present invention.

FIG. 6 is a diagram 600 illustrating an exemplary process of data link recovery in accordance with one embodiment of the present invention. Diagram 600, which is similar to diagram 500 shown in FIG. 5, illustrates a host or base station 102, VRRP routers 106-108, an RNC 110, and Access Gate switches ("AGS") 210-214. It should be noted that the process illustrated in FIG. 6 is a continuation process illustrated in FIG. 5. As shown in FIG. 5, original master router 106 has resumed its master router status after router 108 releases its master status and becomes a backup router. It should be noted that the underlying concept of the exemplary embodiment(s) of the present invention would not change if one or more blocks (circuit) were added to or removed from diagram 600.

Upon resumption of master status, router 106 establishes new data paths 650-652 in place of backup data paths 450-452 between host 102 and RNC 110. Alternatively, router 106 revives original data paths 250-252 as shown in FIG. 2 to facilitate data transfer between RNC 110 and host 102. It should be noted that the switching from data paths 250-252 to data paths 450-452, shown in FIG. 4, and then switching back from data paths 450-452 to data paths 650-652 shown in FIG. 6, are happed and facilitated by routers 106-108 and AGS 210-214. In one embodiment, the network performance between host 102 and RNC 110 is maintained during the switching process between the down links and backup links.

Figure 7:
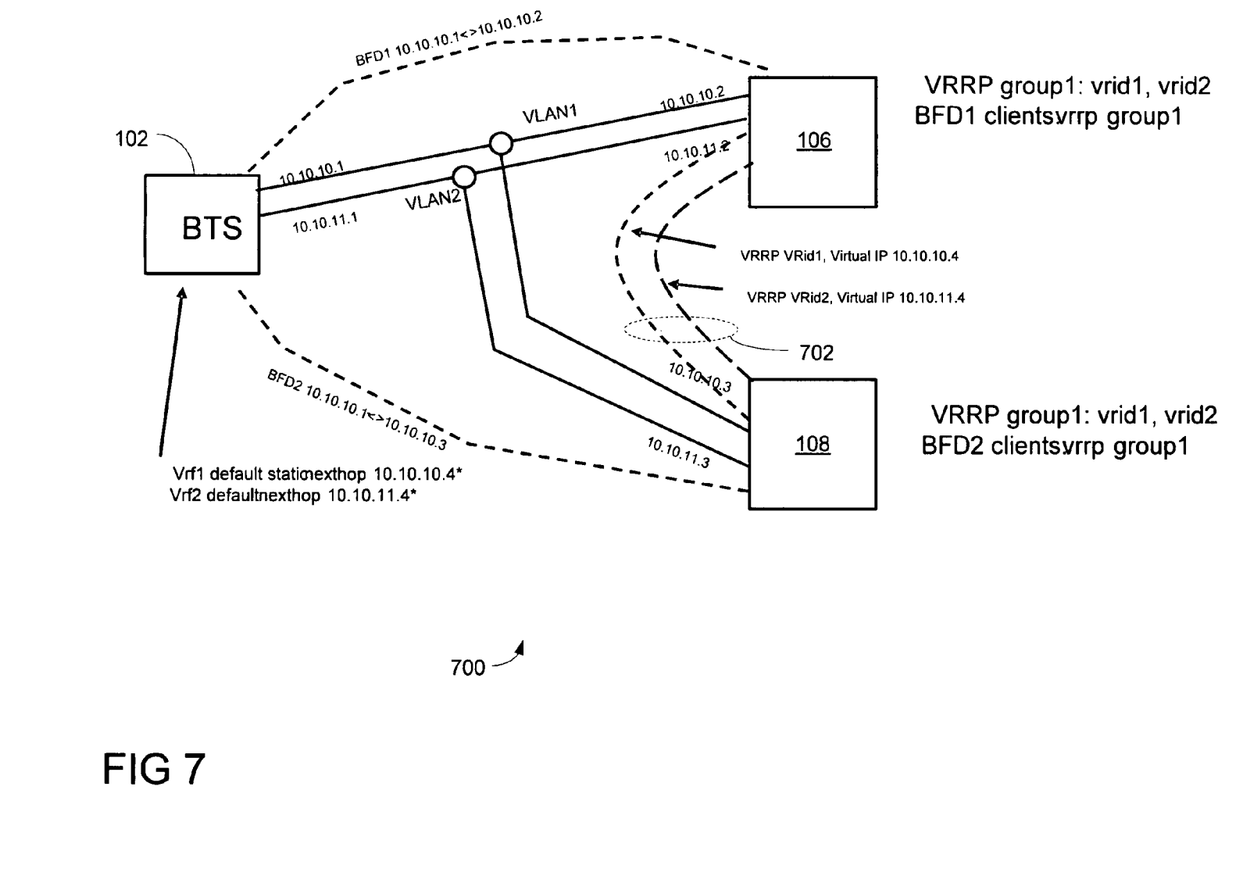
FIG. 7 is a block diagram illustrating an exemplary network layout having multiple VRRP routers in accordance with one embodiment of the present invention.

FIG. 7 is a block diagram 700 illustrating an exemplary network layout having multiple VRRP routers in accordance with one embodiment of the present invention. Diagram 700 includes routers 106-108 and a host or base station 102 wherein routers 106-108 are connected to host 102 via VLAN 1 and VLAN 2. Router 106, in one embodiment, establishes a BDF1 session with IP address "10.10.10.1<>10.10.10.2" to host 102 while router 108 establishes a BDF2 session with IP address "10.10.10.1<>10.10.10.3" to host 102. Host 102 can reach both routers 106-108 via either VLAN1 or VLAN 2. For example, host 102 can use its VLAN1 IP address "10.10.10.1" to reach IP addresses "10.10.10.2" and/or "10.10.10.3" wherein "10.10.10.2" is an IP address for router 106 and "10.10.10.3" is an IP address for router 108. Alternatively, host 102 can use its VLAN2 IP address "10.10.11.1" to reach IP addresses "10.10.11.2" and/or "10.10.11.3" wherein "10.10.11.2" is an IP address for router 106 and "10.10.11.3" is an IP address for router 108. Connection 702, in one example, may be used for VRRP priority management. It should be noted that the underlying concept of the exemplary embodiment(s) of the present invention would not change if one or more blocks (circuit) were added to or removed from diagram 700.

For configurable VRRP routers, one router is designated as a master router and the rest of routers are backup routers. If a BFD session for a specific VRRP interface fails, master router such as router 106 releases a VRRP priority message where priority of the master router is reset to "0" or some other configurable values indicating the lowest priority among the VRRP routers. After VRRP master router lowers its priority, one of the backup routers such as router 108 becomes a new master router. When a previously failed BFD session is reestablished, the original master router such as router 106 sends a VRRP message declaring that router 106 has assigned with the highest priority (example VRRP priority of 255 or other configurable value) and has resumed its status as the master router.

An advantage of employing BDF and VRRP tracking system is to offer various network and application services over $3^{rd}$ party networks. With redundant routers and early detection of service failures, overall network routing performance is enhanced.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 8:
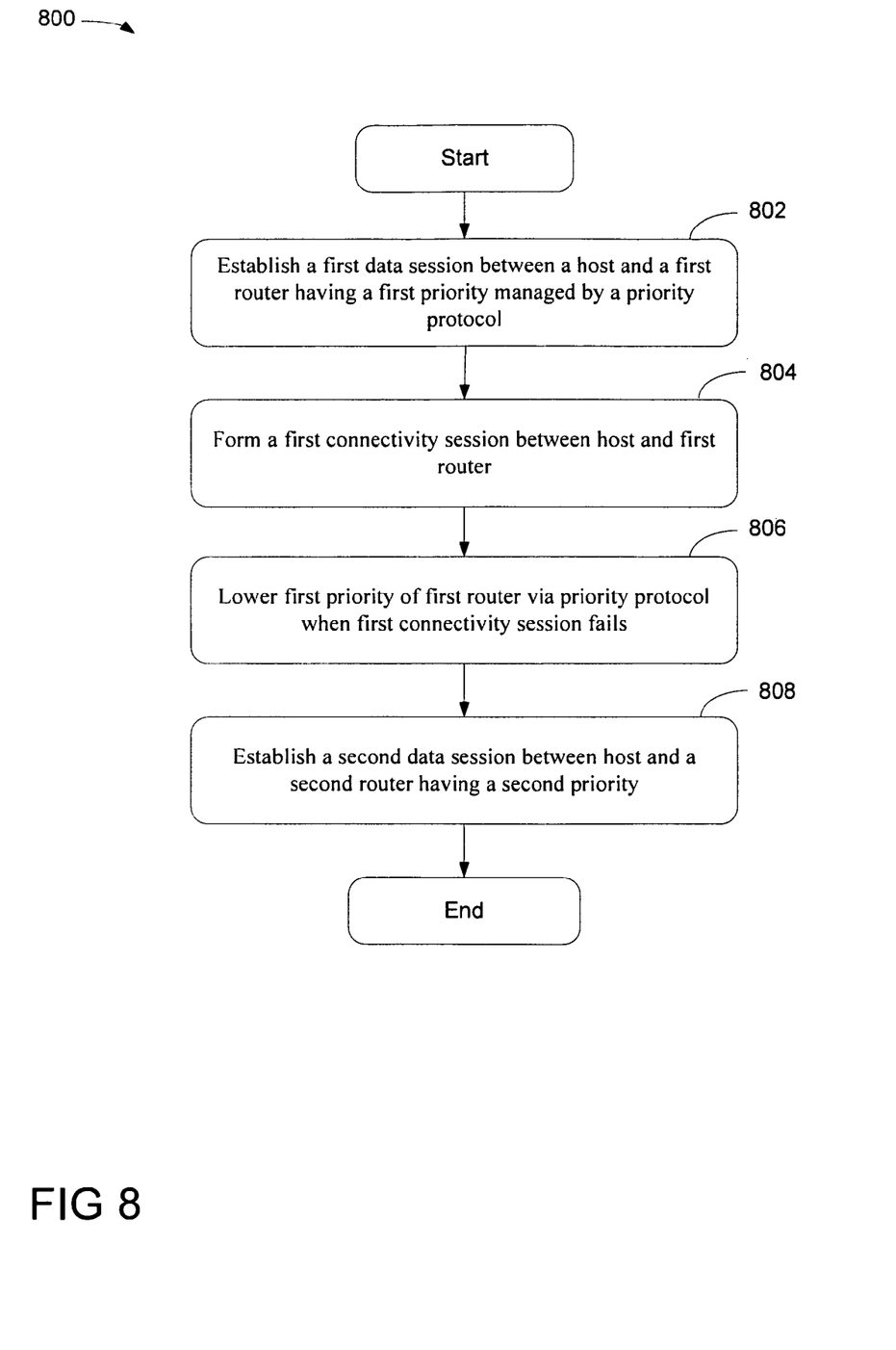
FIG. 8 is a flowchart illustrating a process capable of activating a backup router using a connectivity protocol in accordance with one embodiment of the present invention.

FIG. 8 is a flowchart 800 illustrating a process capable of activating a backup router using a connectivity protocol in accordance with one embodiment of the present invention. At block 802, a process of system communication establishes a first data session between a host and a first router. The first router has been assigned with a first priority or priority value wherein the first priority is managed by a priority protocol. The process, in one embodiment, is capable of managing and prioritizing a group of routers via a VRRP or VRRP message. The process, in one example, facilitates to transfer information or data over a network session or data session between the host and the first router.

At block 804, the process forms a first connectivity session between the host and the first router. For example, the process is capable of sending a connectivity message for connectivity verification between the host and the first router on a predefined time period. In one embodiment, the process activates a BFD session for verifying connectivity between the host and the first router.

At block 806, the process lowers the first priority of the first router via the priority protocol when the first connectivity session fails. For example, when a BFD session fails, the first router lowers its priority whereby a backup router (or a second router) can take over the routing tasks from the first router. The process, for example, is capable of adjusting priority or priority level of the first router from the highest priority to the lowest priority via VRRP.

At block 808, the process establishes a second data session between the host and a second router. The second router, a backup router, is activated to take over routing tasks from the first router. The second router has a second priority managed by the priority protocol. A second connectivity session between the host and the second router can also be formed. The process is also able to repair and reestablish the first connectivity session between the host and the first router after the first connectivity session is down. Upon raising the first priority to a highest priority when the first connectivity session is reestablished, the process resumes the first data session between the host and the first router once the highest priority of the first priority is accomplished via the priority protocol.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for system communication, comprising:
    establishing a first data session between a host and a first router having a first priority managed by a priority protocol;
    forming a first connectivity session between the host and the first router wherein the forming a first connectivity session includes sending a connectivity message between the host and the first router on a predefined time period;
    lowering the first priority of the first router via the priority protocol when the first connectivity session fails; and
    establishing a second data session between the host and a second router having a second priority managed by the priority protocol.

2. The method of claim 1, further comprising forming a second connectivity session between the host and the second router.

3. The method of claim 2, further comprising trying to reestablish the first connectivity session between the host and the first router.

4. The method of claim 3, further comprising:
    raising the first priority to a highest priority when the first connectivity session is reestablished; and
    resuming the first data session between the host and the first router once the highest priority of the first priority is accomplished via the priority protocol.

5. The method of claim 1, wherein the establishing a first data session between a host and a first router having a first priority managed by a priority protocol includes managing and prioritizing a plurality of routers via a virtual router redundancy protocol ("VRRP").

6. The method of claim 1, wherein forming a first connectivity session between the host and the first router includes activating a bidirectional forwarding detection ("BFD") session for verifying connectivity between the host and the first router.

7. The method of claim 1, wherein lowering the first priority of the first router via the priority protocol when the first connectivity session fails includes adjusting priority level of the first router from highest priority to lowest priority via VRRP.

8. The method of claim 1, wherein establishing a first data session includes facilitating information transfer over a network session between the host and the first router.

9. The method of claim 8, wherein establishing a second data session between the host and a second router having a second priority managed by the priority protocol includes activating a backup router to take over routing tasks from the first router.

10. A method of system communication, comprising:
    facilitating a first communication between a host and a master router of a plurality of virtual router redundancy protocol ("VRRP") routers;
    establishing a first bidirectional forwarding detection ("BFD") session between the host and the master router;
    lowering priority levels of the master router when the first BFD session fails; and
    activating a backup router of the plurality of VRRP routers to perform functions of the master router.

11. The method of claim 10, further comprising:
    facilitating a second communication between the host and the backup router; and
    halting data transfer in the first communication.

12. The method of claim 11, further comprising:
    increasing priority levels of the master router when the first BFD session resumes; and
    halting data transfer in the second communication.

13. The method of claim 12, further comprising resuming data transfer in the first communication.

14. The method of claim 10, wherein lowering priority levels of the master router further includes establishing a priority messaging system utilizing VRRP to prioritize the plurality of VRRP routers.

15. The method of claim 10, wherein establishing a first bidirectional forwarding detection ("BFD") session includes monitoring network connectivity between the host and the master router.

16. The method of claim 10, wherein lowering priority levels of the master router when the first BFD session fails includes broadcasting a lowest priority level associated to the master router via a VRRP message.

17. The method of claim 10, wherein activating a backup router of the plurality of VRRP routers to perform functions of the master router includes establishing a second BFD session between the host and the backup router.

18. A network system, comprising:
- a base station configured to communicate with wireless devices;
- a first router coupled with the base station via a data bus and configured to transport data packets via the data bus;
- a bidirectional forwarding detection ("BFD") session coupled with the base station and the first router and configured to verifying connectivity between the base station and the first router; and
- a second router coupled with the first router and configured to communicate with the first router via virtual router redundancy protocol ("VRRP"), wherein the second router takes over routing tasks from the first router when the BFD session fails.

19. The network system of claim 18, wherein the first router is a VRRP router and is capable of adjusting its priority level in response to connectivity of the BFD.

20. The network system of claim 19, wherein the first router is a master router and the second router is a backup router managed by the VRRP.

* * * * *